US012565444B2

(12) United States Patent
Coon et al.

(10) Patent No.: US 12,565,444 B2
(45) Date of Patent: Mar. 3, 2026

(54) GLASS-CERAMIC COMPOSITIONS AND METHODS OF MAKING THEREOF

(71) Applicant: Corning Incorporated, Corning, NY (US)

(72) Inventors: Erin Coon, Lewisburg, PA (US); Qiang Fu, Painted Post, NY (US); Alana Marie Whittier, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 639 days.

(21) Appl. No.: 18/010,676

(22) PCT Filed: Jun. 21, 2021

(86) PCT No.: PCT/US2021/038174
§ 371 (c)(1),
(2) Date: Dec. 15, 2022

(87) PCT Pub. No.: WO2022/005781
PCT Pub. Date: Jan. 6, 2022

(65) Prior Publication Data
US 2023/0227350 A1     Jul. 20, 2023

Related U.S. Application Data

(60) Provisional application No. 63/045,489, filed on Jun. 29, 2020.

(51) Int. Cl.
*C03C 10/00*          (2006.01)

(52) U.S. Cl.
CPC ...... *C03C 10/0009* (2013.01); *C03C 2214/20* (2013.01)

(58) Field of Classification Search
CPC . C03C 10/0009; C03C 2214/20; C03C 3/112; C03C 4/0007; C03C 4/0021; C03C 12/00; C03C 10/0027
See application file for complete search history.

(56) References Cited

U.S. PATENT DOCUMENTS

| | | | |
|---|---|---|---|
| 4,783,429 A | 11/1988 | Shibuya et al. |
| 6,802,894 B2 | 10/2004 | Brodkin et al. |

(Continued)

FOREIGN PATENT DOCUMENTS

| | | |
|---|---|---|
| CN | 104379113 A | 2/2015 |
| WO | 2017/205596 A1 | 11/2017 |

OTHER PUBLICATIONS

International Search Report and Written Opinion of the International Searching Authority; PCT/US21/38174; Mailed Sep. 29, 2021; 15 Pages; Commissioner for Patents.

(Continued)

*Primary Examiner* — Cameron K Miller
(74) *Attorney, Agent, or Firm* — Travis B. Gasa

(57) ABSTRACT

A silicate-based composition includes: 40-80 mol % $SiO_2$, >0-25 mol % MO, 15-40 mol % $R_2O$, >0-10 mol % $Al_2O_3$, >0-10 mol % $P_2O_5$, and >0-5 mol % $ZrO_2$, such that MO is a sum of BeO, MgO, CaO, SrO, and BaO; and $R_2O$ is a sum of $Li_2O$, $Na_2O$, $K_2O$, $Rb_2O$, $Cs_2O$.

17 Claims, 4 Drawing Sheets

(56)                References Cited

U.S. PATENT DOCUMENTS

| | | | |
|---|---|---|---|
| 7,867,930 B2 | 1/2011 | Apel et al. | |
| 8,071,493 B2 | 12/2011 | Yagi | |
| 9,745,218 B2 | 8/2017 | Castillo | |
| 10,457,589 B2 | 10/2019 | Rampf et al. | |
| 2003/0166448 A1 | 9/2003 | Nishikawa et al. | |
| 2006/0021285 A1* | 2/2006 | Rosenflanz | C04B 35/44 |
| | | | 51/309 |
| 2009/0038508 A1* | 2/2009 | Apel | C03B 32/02 |
| | | | 501/59 |
| 2014/0322503 A1 | 10/2014 | Hoscheler | |
| 2015/0087493 A1 | 3/2015 | Ritzberger et al. | |
| 2016/0051349 A1 | 2/2016 | Rheinberger et al. | |
| 2018/0009701 A1 | 1/2018 | Rampf et al. | |

OTHER PUBLICATIONS

Extended European Search Report, EP application No. 21834215.2, dated Jun. 12, 2024, 10 pages, European patent office.

Chinese Patent Application No. 202180046791.X , Office Action dated Mar. 14, 2025, 5 pages (English Translation only), Chinese Patent Office.

Fu, Q., et al., "Nature-inspired design of strong, tough glass-ceramics", MRS Bulletin, 2017, vol. 42, No. 3, pp. 220-225.

Hallmann, L., et al., "Effect of microstructure on the mechanical properties of lithium disilicate glass-ceramics", Journal of the Mechanical Behavior of Biomedical Materials, 2018, vol. 82, pp. 355-370.

Hench, L.L., "Bioceramics", Journal of the American Ceramic Society, 1998, vol. 81, No. 7, pp. 1705-1728.

Kansal, I., et al., "Diopside (CaO • MgO • 2SiO2)-fluorapatite (9CaO • 3P2O5 • CaF2) glass-ceramics: potential materials for bone tissue engineering", Journal of Materials Chemistry, 2011, vol. 21, No. 40, pp. 16247-16256.

Montazerian, M. et al., "History and trends of bioactive glass-ceramics", Journal of Biomedical Materials Research Part A, 2016, vol. 104, No. 5, pp. 1231-1249.

Nonami, T. et al., "Study of diopside ceramics for biomaterials", Journal of Materials Science: Materials in Medicine, 1999, vol. 10, No. 8, pp. 475-479.

Rampf, M., et al., "Controlled parallel crystallization of lithium disilicate and diopside using a combination of internal and surface nucleation", Frontiers in Materials, 2016, vol. 3, pp. 1-9.

Wu, C., et al., "Porous diopside (CaMgSi2O6) scaffold: a promising bioactive material for bone tissue engineering", Acta biomaterialia, 2010, vol. 6, No. 6, pp. 2237-2245.

* cited by examiner

FIG. 3A
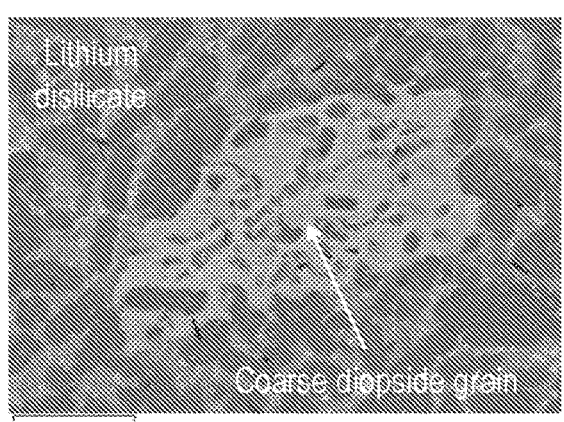
5μm
FIG. 3B
Ca K series
FIG. 3C
Mg K series
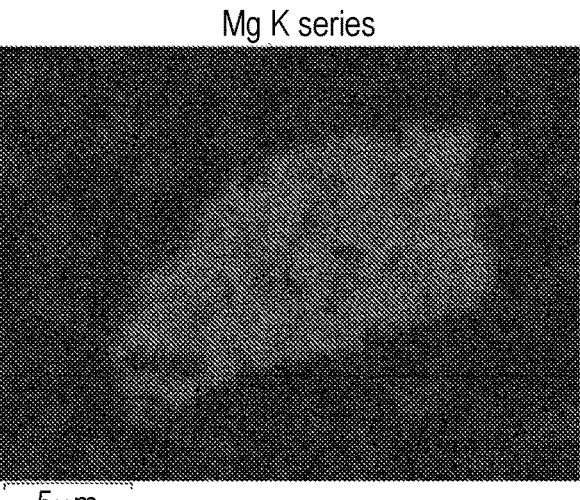
5μm        5μm Comparison of fracture toughness of LS2/apatitte vs
LS2/apatite/diopside g-c Weibull - 95% CI

| | Shape | Scale | N | AD | P |
|---|---|---|---|---|---|
| 700C - 2h800C-4h | 22.34 | 2.232 | 8 | 0.255 | >0.250 |
| 525C-4h/825C-4h | 36.76 | 2.819 | 10 | 0.561 | 0.137 |

GLASS-CERAMIC COMPOSITIONS AND METHODS OF MAKING THEREOF

This is a national stage application under 35 U.S.C. § 371 of International Application No. PCT/US2021/038174, filed on Jun. 21, 2021, which claims the benefit of priority under 35 U.S.C. § 119 of U.S. Provisional Application Ser. No. 63/045,489, filed on Jun. 29, 2020, the contents of which are relied upon and incorporated herein by reference in their entireties.

BACKGROUND

1. Field

The disclosure relates to glass-ceramic compositions and methods of making thereof for biomedical applications.

2. Technical Background

Bioactive materials are a group of glass and glass-ceramic materials that have shown biocompatibility or bioactivity, which has allowed them to be incorporated into human or animal physiology. Generally speaking, bioactive materials are able to bond with hard and soft tissues, thereby fostering growth (e.g., regeneration) of bone/teeth and cartilage cells.

Efforts have been made to produce bioactive materials to achieve high bioactivity and high strength. However, certain promising materials, such as diopside-containing bioactive materials, have been difficult to adopt in biomedical applications due to their lack of bulk nucleation, which is critical for producing porosity-free glass-ceramics with homogeneous microstructures. As a result, these glass-ceramics are prepared from powder sintering processes, which limit their forming capabilities and generate voids due to insufficient densification during sintering, thereby leading to weakened microstructures. Thus, there continues to be an unmet need for bioactive material compositions having an improved strength, while maintaining excellent bioactivity.

This disclosure presents improved biocompatible inorganic compositions for biomedical applications.

SUMMARY

In some embodiments, a silicate-based composition, comprises: 40-80 mol % $SiO_2$, >0-25 mol % MO, 15-40 mol % $R_2O$, >0-10 mol % $Al_2O_3$, >0-10 mol % $P_2O_5$, and >0-5 mol % $ZrO_2$, wherein MO is a sum of BeO, MgO, CaO, SrO, and BaO; and wherein $R_2O$ is a sum of $Li_2O$, $Na_2O$, $K_2O$, $Rb_2O$, $Cs_2O$.

In one aspect, which is combinable with any of the other aspects or embodiments, the silicate-based composition comprises: >0-5 mol % $F^-$. In one aspect, which is combinable with any of the other aspects or embodiments, the silicate-based composition comprises: 15-30 mol % $Li_2O$; and >0-10 mol % a sum of $Na_2O$ and $K_2O$. In one aspect, which is combinable with any of the other aspects or embodiments, the silicate-based composition comprises: >0-5 mol % $Na_2O$; and >0-5 mol % $K_2O$. In one aspect, which is combinable with any of the other aspects or embodiments, the silicate-based composition comprises: >0-15 mol % CaO; and >0-10 mol % MgO. In one aspect, which is combinable with any of the other aspects or embodiments, a sum of $P_2O_5$ and CaO is 1-15 mol %, or a ratio of CaO:$P_2O_5$ is 1:1 to 10:1. In one aspect, which is combinable with any of the other aspects or embodiments, the silicate-based composition comprises: >0-10 mol % $B_2O_3$.

In some embodiments, a silicate-based composition, comprises: 50-70 mol % $SiO_2$, >0-25 mol % MO, 15-40 mol % $R_2O$, >0-5 mol % $Al_2O_3$, 0.5-5 mol % $P_2O_5$, and >0-5 mol % $ZrO_2$, wherein MO is a sum of MgO and CaO; and wherein $R_2O$ is a sum of $Li_2O$, $Na_2O$, and $K_2O$.

In one aspect, which is combinable with any of the other aspects or embodiments, the silicate-based composition comprises: 15-30 mol % $Li_2O$, >0-5 mol % $Na_2O$, and >0-5 mol % $K_2O$. In one aspect, which is combinable with any of the other aspects or embodiments, the silicate-based composition comprises: >0-10 mol % MgO, and >0-15 mol % CaO. In one aspect, which is combinable with any of the other aspects or embodiments, the silicate-based composition comprises: 0.2-5 mol % $F^-$. In one aspect, which is combinable with any of the other aspects or embodiments, the silicate-based composition comprises: >0-5 mol % $B_2O_3$.

In one aspect, which is combinable with any of the other aspects or embodiments, the silicate-based composition is a glass-ceramic composition comprising: at least a major phase including lithium disilicate, diopside, and apatite. In one aspect, which is combinable with any of the other aspects or embodiments, the glass-ceramic composition has a fracture toughness in a range of 2-4 MPa·$M^{1/2}$.

In one aspect, which is combinable with any of the other aspects or embodiments, the silicate-based composition is a glass-ceramic composition and is a particle, bead, particulate, short fiber, long fiber, woolen mesh, combination thereof. In one aspect, which is combinable with any of the other aspects or embodiments, the glass-ceramic composition has at least one size dimension in a range of 1-100 μm. In one aspect, which is combinable with any of the other aspects or embodiments, the glass-ceramic composition has at least one size dimension in a range of 1-10 μm.

In one aspect, which is combinable with any of the other aspects or embodiments, a matrix comprises the silicate-based composition disclosed herein wherein the matrix includes at least one of: dental bridges, dental enamel, dental filling material, bone filling material, orthopedic implants. In one aspect, which is combinable with any of the other aspects or embodiments, the silicate-based composition is a glass-ceramic composition attached to the matrix or mixed therein. In one aspect, which is combinable with any of the other aspects or embodiments, an antibacterial composition comprises the silicate-based composition disclosed herein.

In some embodiments, a bulk nucleation process, comprises: heating at temperatures ranging 600-1000° C. for a predetermined time, a silicate-based composition comprising: 40-80 mol % $SiO_2$, >0-25 mol % MO, 15-40 mol % $R_2O$, >0-10 mol % $Al_2O_3$, >0-10 mol % $P_2O_5$, and >0-5 mol % $ZrO_2$, wherein MO is a sum of BeO, MgO, CaO, SrO, and BaO; and wherein $R_2O$ is a sum of $Li_2O$, $Na_2O$, $K_2O$, $Rb_2O$, $Cs_2O$, to form a glass-ceramic article. In one aspect, which is combinable with any of the other aspects or embodiments, the glass-ceramic article includes a major phase comprising at least lithium disilicate, diopside, and apatite.

BRIEF DESCRIPTION OF THE DRAWINGS

The disclosure will become more fully understood from the following detailed description, taken in conjunction with the accompanying figures, in which:

FIG. 3A illustrates a magnified SEM image (5000×) of a microstructure of Sample 1, according to some embodiments. FIGS. 3B and 3C illustrate EDS elemental mapping of calcium (FIG. 3B) and magnesium (FIG. 3C) in Sample 1 to analyze formation of diopside phase in the material.

DETAILED DESCRIPTION

Figure 1:
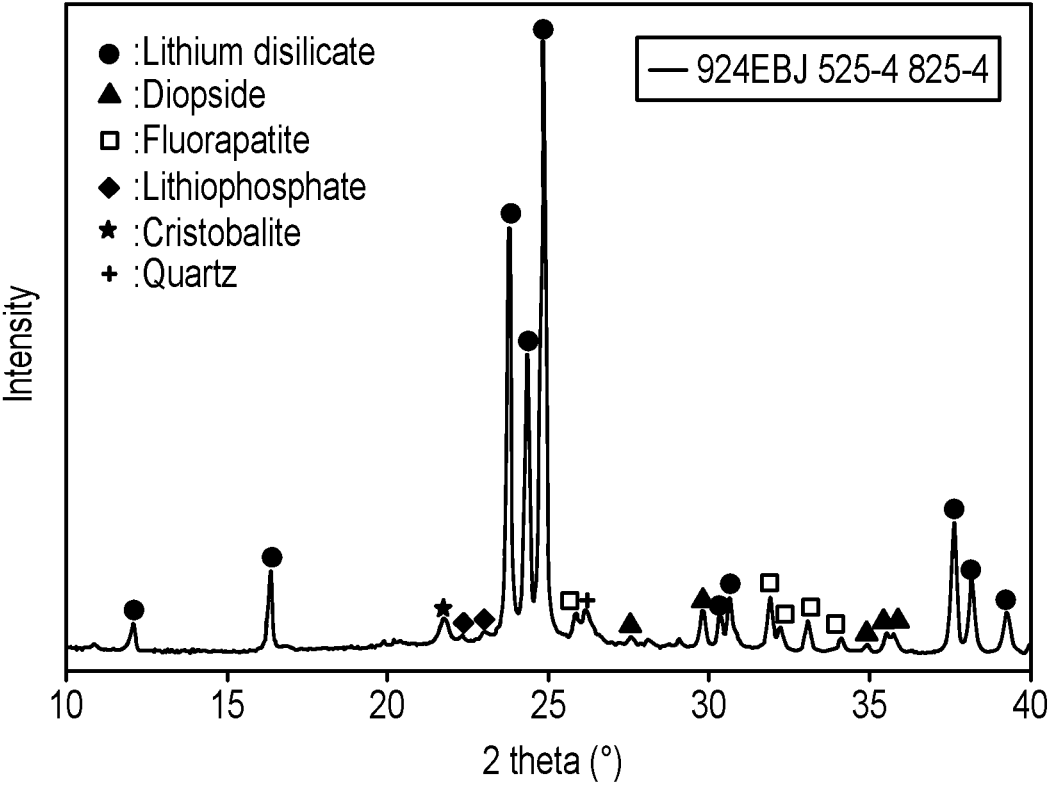
FIG. 1 illustrates an x-ray diffraction (XRD) plot of a phase assemblage of Sample 1, according to some embodiments.

In the following description, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. It also is understood that the various features disclosed in the specification and the drawings can be used in any and all combinations.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. When a numerical value or end-point of a range does not recite "about," the numerical value or end-point of a range is intended to include two embodiments: one modified by "about," and one not modified by "about."

Herein, compositions are expressed in terms of mol % amounts of particular components included therein on an oxide bases unless otherwise indicated. Any component having more than one oxidation state may be present in a composition in any oxidation state. However, concentrations of such component are expressed in terms of the oxide in which such component is at its lowest oxidation state unless otherwise indicated.

Bioactive Material Compositions

Bioactive materials are a group of glass and glass-ceramic materials that have shown biocompatibility or bioactivity, which has allowed them to be incorporated into human or animal physiology. As used herein, "bioactive material," "bioactive composition," "glass," "glass-ceramic," combinations thereof, or the like are used interchangeably. The biocompatibility and in vivo properties of the material are influenced by the composition. In the compositions described herein, $SiO_2$ serves as the primary forming oxide in combination with the bioactive oxides of calcium and phosphorous.

In the present application, novel bioactive material compositions (e.g., glass-ceramics) are disclosed which comprise multiple phases, including lithium disilicate, apatite and diopside in one system.

Lithium disilicate ($Li_2O \cdot 2SiO_2$), is an orthorhombic crystal based on corrugated sheets of $Si_2O_5$ tetrahedral arrays. The crystals are typically tabular or lath-like in shape (e.g., acicular, needle-like morphology), with pronounced cleavage planes. Glass-ceramics based on lithium disilicate offer highly desirable mechanical properties, including high body strength and fracture toughness, due to their microstructures of randomly-oriented interlocking crystals. Glass-ceramics with fracture toughness values of at least 2 $MPa \cdot m^{1/2}$ are achievable in this composition system. Hydroxyapatite ($Ca_{10}(PO_4)_6(OH)_2$ may be used in medical bone and teeth healing applications. It is biocompatible with bone and can be used for orthopedic and dental implants and has found wide applications in biomedical fields. Diopside ($CaO \cdot MgO \cdot 2SiO_2$) is another bioactive ceramic that possesses excellent in vitro apatite-forming ability, in vivo bioactivity and degradation, and improved mechanical strength. Fracture toughness as high as 3.5 $MPa \cdot m^{1/2}$ may be achieved for diopside-containing ceramics.

Compositions disclosed herein (e.g., interlocking lithium silicate and coarse diopsides) are internally nucleated to produce glass-ceramics with homogeneous microstructures and high fracture toughness. The formation of apatite and diopside phases ensure a good biocompatibility for wide biomedical applications.

In some examples, the composition comprises a combination of $SiO_2$, alkaline earth oxides (MO, or the sum of BeO, MgO, CaO, SrO, BaO), and alkali oxides ($R_2O$, or the sum of $Li_2O$, $Na_2O$, $K_2O$, $Rb_2O$, $Cs_2O$). In some examples, the composition further comprises $Al_2O_3$. In some examples, the composition may further comprise $P_2O_5$, $ZrO_2$, and fluorine. For example, the composition may comprise, in mol %: 40-80 $SiO_2$, >0-25 MO, and 15-40 $R_2O$. In some examples, the composition further comprises, in mol %, >0-10 $Al_2O_3$. In some examples, the composition may further comprise, in mol %, >0-10 $P_2O_5$, >0-5 $ZrO_2$, and 0-5 fluorine ($F^-$). The compositions disclosed herein are particularly suitable for biomedical or bioactive applications.

Silicon dioxide ($SiO_2$), which serves as the primary composition-forming oxide component of the embodiments, influences the mechanical strength, biocompatibility and degradation properties (e.g., temperature stability, chemical durability, etc.) of the bioactive compositions. For the compositions disclosed herein, $SiO_2$ functions to stabilize the networking structure of glass and glass-ceramics. Concentration of $SiO_2$ should be sufficiently high to form lithium disilicate crystal phase when the precursor glass is heat treated (i.e., cerammed) to convert to a glass-ceramic material. However, the precursor glass (and the resulting glass-ceramic after ceramming) cannot include too much $SiO_2$ (e.g., greater than 80 mol %) since glass melting temperatures of pure $SiO_2$ or high-$SiO_2$ glasses is undesirably high (200 poise temperature), leading to decreased bioactivity.

In some embodiments, the composition can comprise 40-80 mol % $SiO_2$. In some embodiments, the composition can comprise 50-70 mol % $SiO_2$. In some embodiments, the composition can comprise 40-80 mol %, or 40-60 mol %, or 45-65 mol %, or 50-70 mol %, or 55-75 mol %, or 60-80 mol % $SiO_2$, or any value or range disclosed therein. In some examples, the glass is essentially free of $SiO_2$ or comprises 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80 mol % $SiO_2$, or any value or range having endpoints disclosed herein.

Divalent cation oxides (such as alkaline earth oxides) are important for improvement of (1) melting behavior and bioactivity of the composition; (2) influencing the composition's Young's modulus and coefficient of thermal expansion. Particularly, CaO may react with $P_2O_5$ to form apatite (bioactive ceramic) when immersed in a simulated body fluid (SBF) or in vivo. The release of $Ca^{2+}$ ions from the surface of the glass contributes to the formation of a layer rich in calcium phosphate. Thus, the combination of $P_2O_5$ and CaO may provide advantageous compositions for bioactive glasses.

In some examples, the compositions may comprise $P_2O_5$ and CaO with the sum of $P_2O_5$ and CaO being, in mol %, from 1-15%, or 3-12%, or 5-10%, or any value or range disclosed therein. In some examples, the compositions comprise $P_2O_5$ and CaO with the sum of $P_2O_5$ and CaO being 1, 2, 3, 4, 5, 6, 7, 8, 9, 10, 11, 12, 13, 14, 15 mol %, or any value or range having endpoints disclosed herein. In some examples, the compositions comprise $P_2O_5$ and CaO with the ratio of CaO:$P_2O_5$ being in a range of 1-10, or 2-8, or 3-6 or any value or range having endpoints disclosed herein.

In some examples, the composition can comprise, in mol %, >0-25 alkaline earth oxides (MO, which is the sum of MgO, CaO, SrO, BeO, and BaO). In some examples, the composition can comprise, in mol %, 5-20 MO. In some examples, the composition can comprise, in mol %, >0-25, or >0-20, or 2-20, or 2-15, or 5-15, or 5-10, or 10-25, or 10-20, or >0-15, or >0-10 MO, or any value or range disclosed therein. In some examples, the composition can comprise, in mol %, >0, 1, 2, 3, 4, 5, 6, 7, 8, 9, 10, 11, 12, 13, 14, 15, 16, 17, 18, 19, 20, 21, 22, 23, 24, 25 MO, or any value or range having endpoints disclosed herein.

In some examples, the composition can comprise, in mol %, >0-15 CaO. In some examples, the composition can comprise, in mol %, 5-10 CaO. In some examples, the composition can comprise, in mol %, >0-15, or >0-14, or 1-14, or 1-13, or 2-13, or 2-12, or 3-12, or 3-11, or 4-11, or 4-10, or 5-10 CaO, or any value or range disclosed therein. In some examples, the composition can comprise, in mol %, >0, 1, 2, 3, 4, 5, 6, 7, 8, 9, 10, 11, 12, 13, 14, 15 CaO, or any value or range having endpoints disclosed herein.

In some examples, the composition comprises MgO, which is essential for diopside phase formation. In some examples, the composition can comprise, in mol %, >0-10 MgO. In some examples, the composition can comprise, in mol %, 1-7 MgO. In some examples, the composition can comprise, in mol %, >0-10, or >0-9, or 1-9, or 1-8, or 2-8, or 2-7, or 3-7 MgO, or any value or range disclosed therein. In some examples, the composition can comprise, in mol %, >0, 1, 2, 3, 4, 5, 6, 7, 8, 9, 10 MgO, or any value or range having endpoints disclosed herein.

In some examples, the composition may comprise other alkaline earth oxides, either in combination or individually, such as BeO, SrO, and/or BaO. In some examples, the composition can comprise, in mol %, >0-15 BeO, SrO, and/or BaO, either alone or in combination. In some examples, the composition can comprise, in mol %, >0-15, or >0-14, or 1-14, or 1-13, or 2-13, or 2-12, or 3-12, or 3-11, or 4-11, or 4-10, or 5-10 BeO, SrO, and/or BaO, either alone or in combination, or any value or range disclosed therein. In some examples, the composition can comprise, in mol %, >0, 1, 2, 3, 4, 5, 6, 7, 8, 9, 10, 11, 12, 13, 14, 15 BeO, SrO, and/or BaO, either alone or in combination, or any value or range having endpoints disclosed herein.

Alkali oxides are important for (I) reducing melting temperature and liquidus temperature of the glass; (II) shorten ceramming cycles; (III) increasing thermal expansion after ceramming of the resultant glass-ceramics, if desired; and (IV) improving bioactivity of the bioactive material.

In some examples, the composition can comprise, in mol %, 15-40 alkali oxides ($R_2O$, which is the sum of $Li_2O$, $Na_2O$, $K_2O$, $Rb_2O$, and $Cs_2O$). In some examples, the composition can comprise, in mol %, 20-35 $R_2O$. In some examples, the composition can comprise, in mol %, 15-40, or 15-35, or 20-35, or 20-30, or 15-25, or 25-40, or 20-25, or 25-30, or 30-35 $R_2O$, or any value or range disclosed therein. In some examples, the composition can comprise, in mol %, 15, 16, 17, 18, 19, 20, 21, 22, 23, 24, 25, 26, 27, 28, 29, 30, 31, 32, 33, 34, 35, 36, 37, 38, 39, 40 $R_2O$, or any value or range having endpoints disclosed herein.

In some examples, the composition comprises $Li_2O$, which is essential for forming lithium disilicate crystal phases. In some examples, the composition can comprise, in mol %, 15-30 $Li_2O$. In some examples, the composition can comprise, in mol %, 20-30 $Li_2O$. In some examples, the composition can comprise, in mol %, 15-30, or 15-28, or 17-28, or 17-26, or 19-26, or 19-24 $Li_2O$, or any value or range disclosed therein. In some examples, the composition can comprise, in mol %, 15, 16, 17, 18, 19, 20, 21, 22, 23, 24, 25, 26, 27, 28, 29, 30 $Li_2O$, or any value or range having endpoints disclosed herein.

In some examples, the composition may comprise $Na_2O$ and/or $K_2O$, which particularly affect (I) to (III) as described above, if present at low concentrations. In some examples, the composition can comprise, in mol %, >0-10 $Na_2O$ and/or $K_2O$, either alone or in combination. In some examples, the composition can comprise, in mol %, >0-10, or >0-7, or >0-5, or >0-3, or 1-10, or 1-7, or 1-5, or 1-3, or 5-10, or 3-7 $Na_2O$ and/or $K_2O$, either alone or in combination, or any value or range disclosed therein. In some examples, the composition can comprise, in mol %, >0, 1, 2, 3, 4, 5, 6, 7, 8, 9, 10 $Na_2O$ and/or $K_2O$, either alone or in combination, or any value or range having endpoints disclosed herein.

In some examples, the composition may comprise other alkali oxides, either in combination or individually, such as $Rb_2O$, and/or $Cs_2O$. In some examples, the composition can comprise, in mol %, >0-10 $Rb_2O$, and/or $Cs_2O$, either alone or in combination. In some examples, the composition can comprise, in mol %, >0-10, or >0-7, or >0-5, or >0-3, or 1-10, or 1-7, or 1-5, or 1-3, or 5-10, or 3-7 $Rb_2O$, and/or $Cs_2O$, either alone or in combination, or any value or range disclosed therein. In some examples, the composition can comprise, in mol %, >0, 1, 2, 3, 4, 5, 6, 7, 8, 9, 10 $Rb_2O$, and/or $Cs_2O$, either alone or in combination, or any value or range having endpoints disclosed herein.

In some examples, the composition further comprises network former alumina ($Al_2O_3$), which provides stabilization to the networking structure, as well as contributing to improved mechanical properties and chemical durability in silicate glasses while having no toxicity concerns. Above a certain content concentration, alumina generally increases viscosity of the melt and decreases the fraction of lithium disilicate crystals to an extent that no interlocking structure can be formed. The lack of interlocking structure leads to weakening mechanical state. Additionally, alumina also helps lower liquidus temperature and coefficient of thermal expansion, or, enhance the strain point. In some examples, the composition can comprise, in mol %, >0-10 $Al_2O_3$. In some examples, the composition can comprise, in mol %, >0-10, or >0-7, or >0-5, or >0-3, or 1-10, or 1-7, or 1-5, or 1-3, or 5-10, or 3-7 $Al_2O_3$, or any value or range disclosed therein. In some examples, the composition can comprise, in mol %, >0, 1, 2, 3, 4, 5, 6, 7, 8, 9, 10 $Al_2O_3$, or any value or range having endpoints disclosed herein.

In some examples, the composition further comprises network former phosphorus pentoxide ($P_2O_5$), which serves as a nucleating agent for bulk nucleation in glass and glass-ceramic compositions disclosed herein. Inclusion and liberation of phosphate ions to the surface of bioactive glasses increases apatite formation rate and the binding capacity in physiological applications. Additionally, $P_2O_5$ increases glass viscosity, which expands the glass's range of operating temperatures and is advantageous to its manufacture and formation. If $P_2O_5$ concentration is too low, the precursor glass will not crystallize. If $P_2O_5$ concentration is too high, devitrification (occurring during cooling of the precursor glass) can be difficult to control. In some examples, the composition can comprise, in mol %, >0-10 $P_2O_5$. In some examples, the composition can comprise, in mol %, >0-10, or >0-7, or >0-5, or >0-3, or 1-10, or 1-7, or 1-5, or 1-3, or 5-10, or 3-7 $P_2O_5$, or any value or range disclosed therein. In some examples, the composition can comprise, in mol %, >0, 1, 2, 3, 4, 5, 6, 7, 8, 9, 10 $P_2O_5$, or any value or range having endpoints disclosed herein.

In some examples, the composition further comprises network former/precursor glass intermediate zirconium oxide ($ZrO_2$), which helps to improve stability in $Li_2O$—$Al_2O_3$—$SiO_2$—$P_2O_5$ glasses by significantly reducing glass devitrification during the formation process and lowering liquidus temperature. Furthermore, $ZrO_2$ may also increase chemical durability of related glass-ceramics. Clear precursor glass patties can be formed from glasses containing >0.2 mol % $ZrO_2$. In some examples, the composition can comprise, in mol %, >0-5 $ZrO_2$. In some examples, the composition can comprise, in mol %, >0-5, or >0-3, or >0-2, or >0-1.5, or >0-1 $ZrO_2$, or any value or range disclosed therein. In some examples, the composition can comprise, in mol %, >0, 0.5, 1, 1.5, 2, 2.5, 3, 3.5, 4, 4.5, 5 $ZrO_2$, or any value or range having endpoints disclosed herein.

In some examples, the composition further comprises network former boron oxide ($B_2O_3$), which is beneficial for glass melting, if present at low concentrations. In some examples, the composition can comprise, in mol %, >0-10 $B_2O_3$. In some examples, the composition can comprise, in mol %, >0-10, or >0-7, or >0-5, or >0-3, or 1-10, or 1-7, or 1-5, or 1-3, or 5-10, or 3-7 $B_2O_3$, or any value or range disclosed therein. In some examples, the composition can comprise, in mol %, >0, 1, 2, 3, 4, 5, 6, 7, 8, 9, 10 $B_2O_3$, or any value or range having endpoints disclosed herein.

In some examples, the composition further comprises a fluorine source (e.g., $CaF_2$), which can be batched in during composition formation. Fluorine ($F^-$) is essential for forming fluorapatite phases. In some examples, the composition can comprise, in mol %, >0-5 $F^-$. In some examples, the composition can comprise, in mol %, >0-5, or >0-3, or >0-2, or >0-1.5, or >0-1 $F^-$, or any value or range disclosed therein. In some examples, the composition can comprise, in mol %, >0, 0.5, 1, 1.5, 2, 2.5, 3, 3.5, 4, 4.5, 5 $F^-$, or any value or range having endpoints disclosed herein.

Additional components can be incorporated into the composition to provide additional benefits or may be incorporated as contaminants typically found in commercially-prepared compositions. For example, additional components can be added as coloring or fining agents (e.g., to facilitate removal of gaseous inclusions from melted batch materials used to produce the glass) and/or for other purposes. In some examples, the compositions may comprise one or more compounds useful as ultraviolet radiation absorbers. In some examples, the composition can comprise 3 mol % or less $ZnO$, $TiO_2$, $CeO$, $MnO$, $Nb_2O_5$, $MoO_3$, $Ta_2O_5$, $WO_3$, $SnO_2$, $Fe_2O_3$, $As_2O_3$, $Sb_2O_3$, Cl, Br, or combinations thereof. In some examples, the composition can comprise, in mol %, 0-3, or 0-2, or 0-1, or 0-0.5, or 0-0.1, or 0-0.05, or 0-0.01 $ZnO$, $TiO_2$, $CeO$, $MnO$, $Nb_2O_5$, $MoO_3$, $Ta_2O_5$, $WO_3$, $SnO_2$, $Fe_2O_3$, $As_2O_3$, $Sb_2O_3$, Cl, Br, or combinations thereof. The compositions, according to some examples, can also include various contaminants associated with batch materials and/or introduced into the composition by the melting, fining, and/or forming equipment used to produce the composition. For example, in some embodiments, the glass can comprise, in mol %, 0-3, or 0-2, or 0-1, or 0-0.5, or 0-0.1, or 0-0.05, or 0-0.01 $SnO_2$, $Fe_2O_3$, or combinations thereof.

EXAMPLES

The embodiments described herein will be further clarified by the following examples.

Non-limiting examples of amounts of oxides for forming the embodied compositions are listed in Table 1, along with the properties of the resulting compositions. Phase assemblage is analyzed by x-ray diffraction (XRD). XRD was conducted using a Bruker D4 Endeavor equipped with a LynxEye™ silicon strip detector. X-ray scanning was conducted from 5° to 80° (2θ) for data collection.

TABLE 1

| Oxide (mol %) | Comparative | 1 | 2 | 3 | 4 | 5 | 6 | 7 | 8 |
|---|---|---|---|---|---|---|---|---|---|
| $SiO_2$ | 61.2 | 61.6 | 61.2 | 60.8 | 60.1 | 62.1 | 62.3 | 62.5 | 61.6 |
| $Al_2O_3$ | 1.5 | 1.4 | 1.3 | 1.3 | 1.2 | 1.4 | 1.4 | 1.4 | 1.4 |
| $Li_2O$ | 24.5 | 22.4 | 21.6 | 20.9 | 19.5 | 22.5 | 22.6 | 22.7 | 22.4 |
| $Na_2O$ | 2.0 | 1.8 | 1.8 | 1.7 | 1.6 | 1.8 | 1.8 | 1.8 | 1.8 |
| $MgO$ | 0.0 | 3.0 | 3.8 | 4.5 | 5.8 | 3.0 | 3.0 | 3.0 | 4.1 |
| $CaO$ | 6.5 | 5.9 | 6.6 | 7.2 | 8.3 | 6.0 | 6.0 | 6.0 | 5.9 |
| $P_2O_5$ | 1.7 | 1.5 | 1.5 | 1.4 | 1.4 | 1.6 | 1.6 | 1.6 | 1.5 |

TABLE 1-continued

| Oxide (mol %) | Comparative | 1 | 2 | 3 | 4 | 5 | 6 | 7 | 8 |
|---|---|---|---|---|---|---|---|---|---|
| ZrO$_2$ | 1.0 | 0.9 | 0.9 | 0.8 | 0.8 | 0.9 | 0.9 | 0.9 | 0.9 |
| F$^-$ | 1.6 | 1.5 | 1.4 | 1.4 | 1.3 | 0.7 | 0.4 | 0.0 | 0.4 |
| Ceramming cycle | 700° C.-2 hr 800° C.-4 hr | 525° C.-4 hr 825° C.-4 hr | 525° C.-4 hr 800° C.-4 hr | 525° C.-4 hr 800° C.-4 hr | 525° C.-4 hr 800° C.-4 hr | 525° C.-4 hr 825° C.-4 hr | 525° C.-4 hr 825° C.-4 hr | 525° C.-4 hr 825° C.-4 hr | 525° C.-4 hr 825° C.-4 hr |
| Appearance | White translucent, fine grain | | White translucent, coarse grain | | Surface crystallization | White translucent, fine grain | | | White translucent, coarse grain |
| Phase assemblage | (1)-(4) | (1)-(6) | (1)-(6) | (1)-(6) | (1)-(6) | (1), (2), (4)-(6) | (1)-(6) | (1), (3), (4), (6) | (1)-(6) |

Where, (1) is lithium disilicate; (2) is fluorapatite; (3) is quartz; (4) is lithiophosphate; (5) is diopside; and (6) is cristobalite.

The compositions disclosed herein can be in any form that is useful for the medical and dental processes disclosed, for example: particles, powder, microspheres, fibers, sheets, beads, scaffolds, woven fibers, etc.

Table 1 represents glass-ceramic compositions (cerammed from their glass counterparts) having multiple crystalline phases, including lithium disilicate, diopside, and fluorapatite. Additional phases can include lithiophosphate, quartz, and cristobalite.

Example 1—Precursor Glass Composition Formation

Glasses having the oxide contents listed in Table 1 can be made via traditional methods (e.g., rolling, molding, and float processes). In some examples, the precursor glasses can be formed by thoroughly mixing the requisite batch materials (for example, using a tubular mixer) in order to secure a homogeneous melt, and subsequently placing into silica and/or platinum crucibles. The crucibles can be placed into a furnace and the glass batch melted and maintained at temperatures below 1500° C. or below 1400° C. (e.g., ranging from 1100° C. to 1400° C.) for times ranging from about 6 hours to 24 hours. The melts can thereafter be poured into steel molds to yield glass slabs. Subsequently, those slabs can be transferred immediately to an annealer operating at about 400° C. to 700° C., where the glass is held at temperature for about 0.5 hour to 3 hours and subsequently cooled overnight. In another non-limiting example, precursor glasses are prepared by dry blending the appropriate oxides and mineral sources for a time sufficient to thoroughly mix the ingredients. The glasses are melted in platinum crucibles at temperatures ranging from about 1100° C. to 1400° C. and held at temperature for about 6 hours to 16 hours. The resulting glass melts are then poured onto a steel table to cool. The precursor glasses are then annealed at appropriate temperatures.

The embodied glass compositions can be ground into fine particles in the range of 1-10 microns (μm) by air jet milling or short fibers. The particle size can be varied in the range of 1-100 μm using attrition milling or ball milling of glass frits. Furthermore, these glasses can be processed into short fibers, beads, sheets or three-dimensional scaffolds using different methods. Short fibers are made by melt spinning or electric spinning; beads can be produced by flowing glass particles through a hot vertical furnace or a flame torch; sheets can be manufactured using thin rolling, float or fusion-draw processes; and scaffolds can be produced using rapid prototyping, polymer foam replication and particle sintering.

Continuous fibers can be easily drawn from the claimed composition using processes known in the art. For example, fibers can be formed using a directly heated (electricity passing directly through) platinum bushing. Glass cullet is loaded into the bushing, heated up until the glass can melt. Temperatures are set to achieve a desired glass viscosity (usually <1000 poise) allowing a drip to form on the orifice in the bushing (Bushing size is selected to create a restriction that influences possible fiber diameter ranges). The drip is pulled by hand to begin forming a fiber. Once a fiber is established it is connected to a rotating pulling/collection drum to continue the pulling process at a consistent speed. Using the drum speed (or revolutions per minute RPM) and glass viscosity the fiber diameter can be manipulated—in general the faster the pull speed, the smaller the fiber diameter. Glass fibers with diameters in the range of 1-100 μm can be drawn continuously from a glass melt. Fibers can also be created using an updraw process. In this process, fibers are pulled from a glass melt surface sitting in a box furnace. By controlling the viscosity of the glass, a quartz rod is used to pull glass from the melt surface to form a fiber. The fiber can be continuously pulled upward to increase the fiber length. The velocity that the rod is pulled up determines the fiber thickness along with the viscosity of the glass.

Example 2—Glass-Ceramic Composition Formation

After forming the precursor glasses as described in Example 1, the precursor glasses were subjected to a heat treatment (i.e., ceramming) as follows: (a) a first temperature ramp from room temperature (RT) to a nucleation step temperature at 5° C./min; (b) a first isothermal hold at the nucleation step temperature for a first predetermined time; (c) a second temperature ramp from the nucleation step temperature to a crystallization step temperature at 5° C./min; (d) a second isothermal hold at the crystallization step temperature for a second predetermined time; and (e) a final cooling from the crystallization step temperature to room temperature at the natural rate of cooling within the furnace. Table 1 shows properties (appearance, phase assemblage) of the glass-ceramics formed as a result of the ceramming treatment.

Example 3—Characterization

Turning now to the figures, FIG. 1 illustrates an x-ray diffraction (XRD) plot of a phase assemblage of Sample 1 from Table 1. As is explained above in Examples 1 and 2, precursor glasses are cerammed into glass-ceramic articles with high crystallinity (typically over 50%). FIG. 1 shows that this ceramming process does indeed lead to high crystalline structures. For example, Sample 1 includes multiple crystalline phases, such as major phases lithium disilicate, diopside and fluorapatite and minor phases lithiophosphate, quartz, and cristobalite can also be formed. Low peak intensities for diopside and fluorapatite major phases correspond to low weight percentiles of the phases.

Figure 2A:
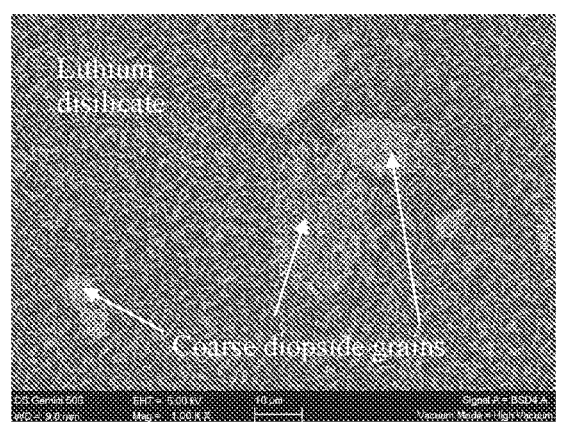
FIGS. 2A and 2B illustrate scanning electron microscopy (SEM) images of a microstructure of Sample 1, according to some embodiments.
Figure 2B:
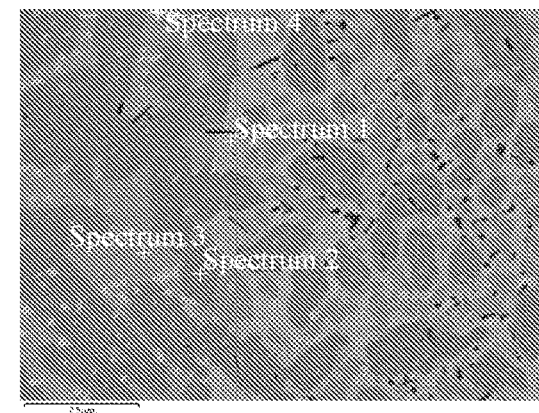
Figure 2C:
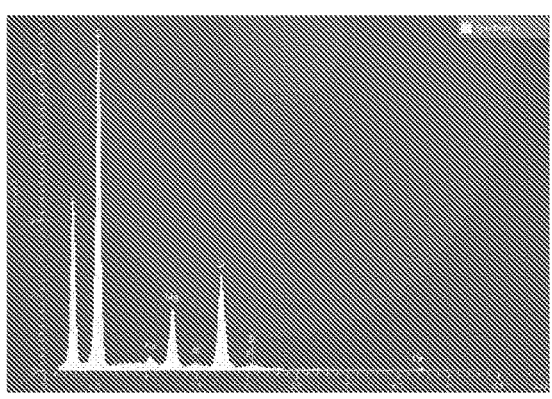
FIGS. 2C to 2F illustrates energy-dispersive x-ray spectroscopy (EDS) analysis of phases present in the microstructure of Sample 1, according to some embodiments.

FIGS. 2A and 2B illustrate scanning electron microscopy (SEM) images of a microstructure of Sample 1 while FIGS. 2C to 2F illustrate energy-dispersive x-ray spectroscopy (EDS) analysis of phases present in the microstructure of Sample 1.

Figure 2D:
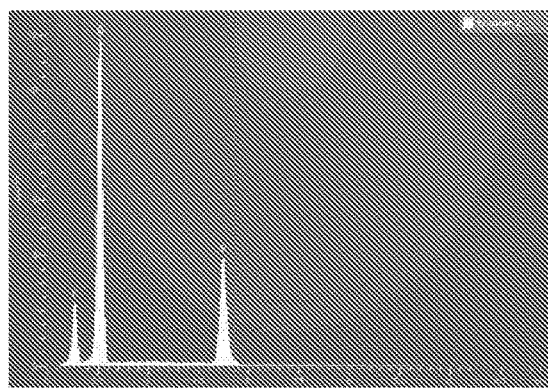
Figure 2E:
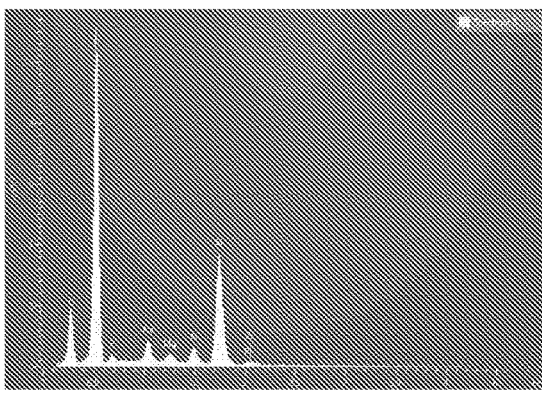
Figure 2F:
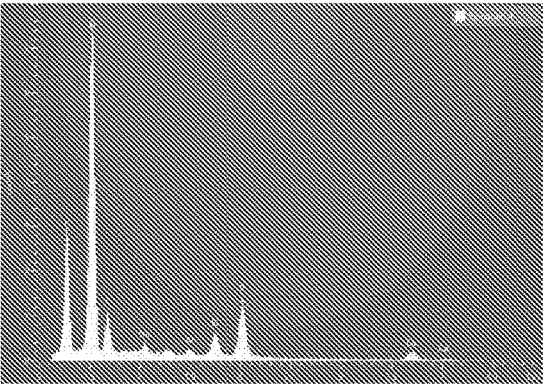

Specifically, FIGS. 2A and 2B provide SEM images of the microstructure of Sample 1 at magnifications of 1000× and 10000×, respectively. FIG. 2A shows glass-ceramic articles composed of interlocking lithium disilicate embedded with coarse diopside grains obtained by ceramming precursor glasses at temperatures ranging at 600-1000° C. for a predetermined time. FIG. 2B marks the locations of EDS analysis of FIGS. 2C-2F. Magnesium and calcium peaks from the coarse white phase of the microstructure of Sample 1 indicate the presence of a diopside phase (FIG. 2C) while silicon peaks from the acicular black phase confirms the presence of a lithium disilicate phase (FIG. 2D). FIG. 2E indicates a partitioning of Na, Zr, P, Si, Al, Mg and CaO in a glassy phase of Sample 1 while an association of fluorine, phosphorus, and calcium in FIG. 2F suggests formation of fluorapatite. Thus, by EDS analysis, Sample 1 is confirmed to have lithium disilicate, diopside and fluorapatite major phases.

Formation of apatite and diopside phases (bioactive ceramics) ensures good biocompatibility of the compositions for biomedical applications. Residual glass in the disclosed glass-ceramics (post-ceramming) may be ion-exchanged to create a compressive stress layer in a surface of the ware to further improve its mechanical strength.

FIG. 3A illustrates another magnified SEM image (5000×) of a microstructure of Sample 1. EDS elemental mapping of the microstructure of FIG. 3A provides further evidence of diopside crystals in the glass-ceramic, with majority of calcium (FIG. 3B) and magnesium (FIG. 3C) present in the white coarse grains.

Figure 4:
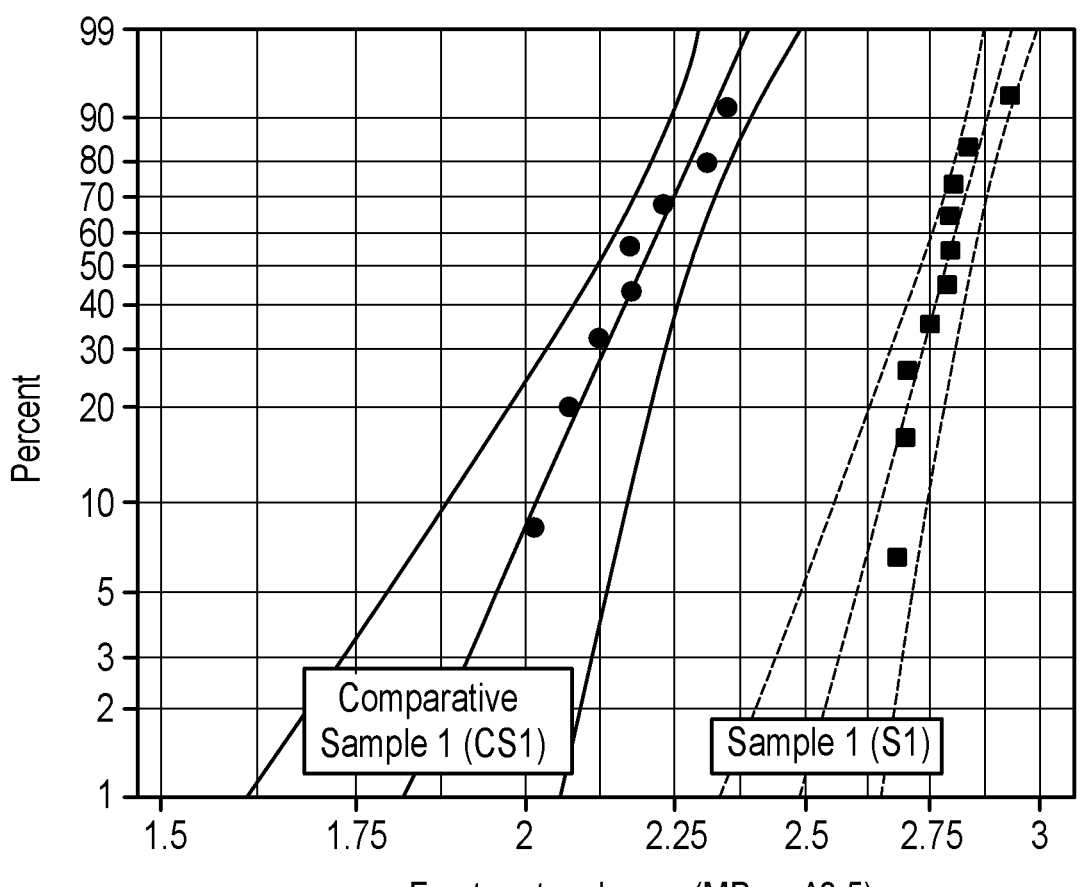
FIG. 4 illustrates a comparison of fracture toughness for Sample 1 (having lithium disilicate, diopside, and fluorapatite main phases) and Comparative Sample 1 (having lithium disilicate and fluorapatite main phases), according to some embodiments.

FIG. 4 illustrates a comparison of fracture toughness for Sample 1 (having lithium disilicate, diopside, and fluorapatite main phases) and Comparative Sample 1 (having lithium disilicate and fluorapatite main phases). Sample 1 was cerammed using a cycle of 525° C. for 4 hrs and 825° C. for 4 hrs with a ramp rate of 5° C./min; Comparative Sample 1 was cerammed using a cycle of 700° C. for 2 hrs and 800° C. for 4 hrs. Fracture toughness was measured using a chevron-notched short beam method according to ASTM. A significantly higher fracture toughness was observed in Sample 1.

Interlocking crystals as a result of multiple phases helps develop toughening mechanisms (e.g., including crack deflection and tortuous crack path) which contribute to high fracture toughness. A $K_{ic}$ value ranging between about 2.65-2.9 MPa·M$^{1/2}$ was observed in Sample 1 while for Comparative Sample 1, the $K_{ic}$ value varied between about 2-2.35 MPa·M$^{1/2}$, which is significantly lower than that for Sample 1.

Without being bound by theory, the improved toughness in Sample 1 is believed to result from the presence of coarse diopside grains within the microstructure. Thus, fracture toughness in a range of 2-4 MPa·M$^{1/2}$ is achievable in the novel glass-ceramic compositions disclosed herein.

Example 4—Composition Bioactivity

Aspects are related to compositions or matrices containing embodied bioactive compositions and the methods of using the matrices to treat medical conditions. The matrices can be dental bridges, dental enamel, dental filling material, bone filling material, orthopedic implants. The bioactive compositions claimed can be physically or chemically attached to matrices or other matrix components, or simply mixed in. As noted above, the bioactive compositions can be in any form that works in the application, including particles, beads, particulates, short fibers, long fibers, or woolen meshes. The methods of using the glass-containing matrices to treat a medical condition can be simply like the use of matrix as normally applied.

Thus, as presented herein, biocompatible inorganic compositions for biomedical applications are described having improved bioactivity.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

References herein to the positions of elements (e.g., "top," "bottom," "above," "below," "first," "second," etc.) are merely used to describe the orientation of various elements in the FIGURES. It should be noted that the orientation of various elements may differ according to other exemplary embodiments, and that such variations are intended to be encompassed by the present disclosure. Moreover, these relational terms are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. In other words, the terms "about," "approximately," and the like, mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Thus, a composition that is "free" or "essentially free" of a component is one in which that component is not actively added or batched into the glass, but may be present in very small amounts as a contaminant (e.g., 500, 400, 300, 200, or 100 parts per million (ppm) or less or).

As utilized herein, "optional," "optionally," or the like are intended to mean that the subsequently described event or circumstance can or cannot occur, and that the description includes instances where the event or circumstance occurs and instances where it does not occur. As used herein, the indefinite articles "a," "an," and the corresponding definite article "the" mean "at least one" or "one or more," unless otherwise specified.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

Unless otherwise specified, all compositions are expressed in terms of as-batched mole percent (mol %). As will be understood by those having ordinary skill in the art, various melt constituents (e.g., silicon, alkali- or alkaline-based, boron, etc.) may be subject to different levels of volatilization (e.g., as a function of vapor pressure, melt time and/or melt temperature) during melting of the constituents. As such, the as-batched mole percent values used in relation to such constituents are intended to encompass values within ±0.5 mol % of these constituents in final, as-melted articles. With the forgoing in mind, substantial compositional equivalence between final articles (glass-ceramic compositions) and as-batched compositions (precursor glasses) is expected. For example, substantial compositional equivalence is expected between the precursor glass and glass-ceramic after the step of heat treatment (ceramming).

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A glass-ceramic composition, comprising:
40-80 mol % $SiO_2$,
>0-25 mol % MO,
15-40 mol % $R_2O$,
>0-10 mol % $Al_2O_3$,
>0-10 mol % $P_2O_5$, and
>0-5 mol % $ZrO_2$,
wherein MO is a sum of BeO, MgO, CaO, SrO, and BaO;
wherein $R_2O$ is a sum of $Li_2O$, $Na_2O$, $K_2O$, $Rb_2O$, $Cs_2O$; and
wherein the glass-ceramic comprises lithium disilicate, apatite, and diopside phases.

2. The glass-ceramic composition of claim 1, further comprising:
>0-5 mol % $F^-$.

3. The glass-ceramic composition of claim 1, comprising:
15-30 mol % $Li_2O$; and
>0-10 mol % a sum of $Na_2O$ and $K_2O$.

4. The glass-ceramic composition of claim 1, comprising:
>0-15 mol % CaO; and
>0-10 mol % MgO.

5. The glass-ceramic composition of claim 4, wherein:
a sum of $P_2O_5$ and CaO is 1-15 mol %, or
a ratio of $CaO:P_2O_5$ is 1:1 to 10:1.

6. The glass-ceramic composition of claim 1, further comprising:
>0-10 mol % $B_2O_3$.

7. A glass-ceramic composition, comprising:
50-70 mol % $SiO_2$,
>0-25 mol % MO,
15-40 mol % $R_2O$,
>0-5 mol % $Al_2O_3$,
0.5-5 mol % $P_2O_5$, and
>0-5 mol % $ZrO_2$,
wherein MO is a sum of MgO and CaO;
wherein $R_2O$ is a sum of $Li_2O$, $Na_2O$, and $K_2O$; and
wherein the glass-ceramic comprises lithium disilicate, apatite, and diopside phases.

8. The glass-ceramic composition of claim 7, comprising:
15-30 mol % $Li_2O$,
>0-5 mol % $Na_2O$, and
>0-5 mol % $K_2O$.

9. The glass-ceramic composition of claim 7, comprising:
>0-10 mol % MgO, and
>0-15 mol % CaO.

10. The glass-ceramic The silicate-based composition of claim 7, further comprising:
0.2-5 mol % $F^-$.

11. The glass-ceramic The silicate-based composition of claim 7, further comprising:
>0-5 mol % $B_2O_3$.

12. The glass-ceramic composition of claim 1, wherein the glass-ceramic composition has a fracture toughness in a range of 2-4 $MPa \cdot M^{1/2}$.

13. The glass-ceramic composition of claim 1, wherein the silicate-based composition is a particle, bead, particulate, short fiber, long fiber, woolen mesh, combination thereof.

14. The glass-ceramic composition of claim 13, wherein the glass-ceramic composition has at least one size dimension in a range of 1-100 μm.

15. A matrix comprising the glass-ceramic composition of claim 1, wherein:
the matrix includes at least one of: dental bridges, dental enamel, dental filling material, bone filling material, orthopedic implants.

16. An antibacterial composition comprising the glass-ceramic composition of claim 1.

17. A bulk nucleation process, comprising:
heating at temperatures ranging 600-1000° C. for a predetermined time, a silicate-based composition comprising:
40-80 mol % $SiO_2$,
>0-25 mol % MO,
15-40 mol % $R_2O$,
>0-10 mol % $Al_2O_3$,
>0-10 mol % $P_2O_5$, and
>0-5 mol % $ZrO_2$,
wherein MO is a sum of BeO, MgO, CaO, SrO, and BaO; and
wherein $R_2O$ is a sum of $Li_2O$, $Na_2O$, $K_2O$, $Rb_2O$, $Cs_2O$,
to form a glass-ceramic article wherein the glass-ceramic comprises lithium disilicate, apatite, and diopside phases.

*     *     *     *     *